J. D. BENBOW.
CAR TRUCK.
APPLICATION FILED JAN. 24, 1920.

1,361,808.

Patented Dec. 14, 1920.
2 SHEETS—SHEET 1.

Witness
Milton Lenoir

Inventor
James D. Benbow
Adams & Jackson
Attorneys

J. D. BENBOW.
CAR TRUCK.
APPLICATION FILED JAN. 24, 1920.
1,361,808.
Patented Dec. 14, 1920.
2 SHEETS—SHEET 2.
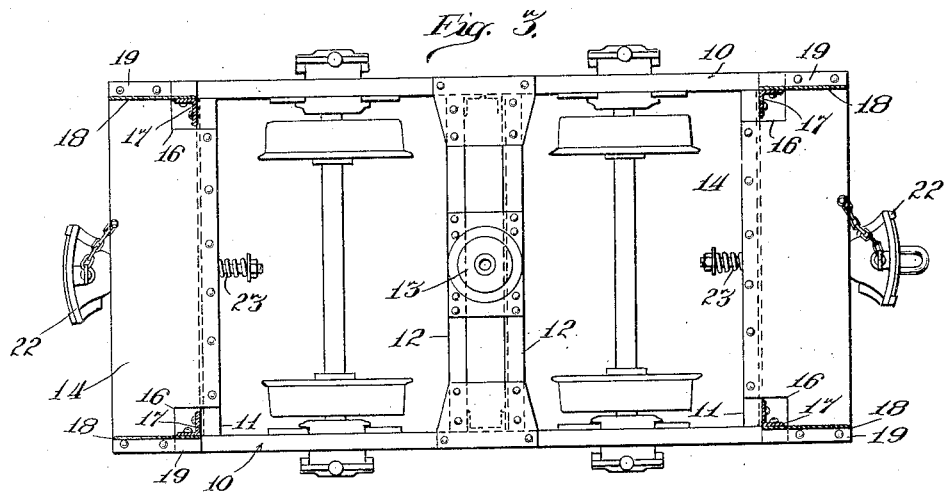
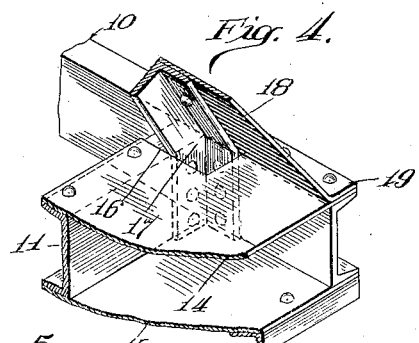
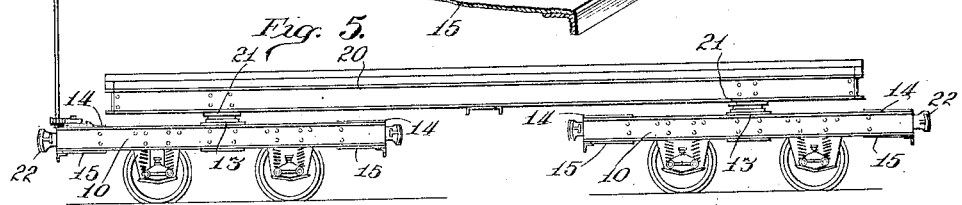
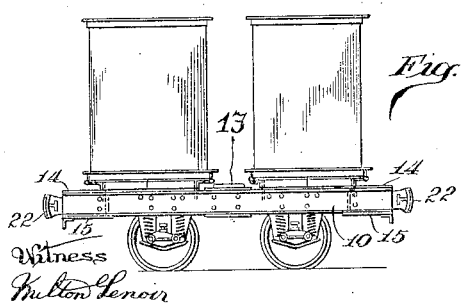

UNITED STATES PATENT OFFICE.

JAMES D. BENBOW, OF AURORA, ILLINOIS, ASSIGNOR TO WESTERN WHEELED SCRAPER COMPANY, OF AURORA, ILLINOIS, A CORPORATION OF ILLINOIS.

CAR-TRUCK.

1,361,808.  Specification of Letters Patent.  Patented Dec. 14, 1920.

Application filed January 24, 1920. Serial No. 353,646.

*To all whom it may concern:*

Be it known that I, JAMES D. BENBOW, a citizen of the United States, and a resident of Aurora, in the county of Kane and State of Illinois, have invented certain new and useful Improvements in Car-Trucks, of which the following is a specification, reference being had to the accompanying drawings.

This invention relates to improvements in that class of cars particularly designed for use by contractors when building or repairing railroads and has particularly to do with the construction of the truck of such a car whereby the truck may be adapted for use in supporting a rocking or tiltable dumping body or one or more receptacles that can be lifted by power on to and off of the truck, or that may be coupled together in pairs and in spaced relation to each other by a comparatively long load-supporting platform adapted to carry articles of too great length to be suitably placed upon a single truck. By reason of the convertible character of the truck a very considerable saving to a contractor may be effected as it reduces the amount of rolling stock needed to be kept on hand for the hauling of different classes of road-building materials.

In the drawings,—

Fig. 3 is a top plan view of the truck,— the car-body supports being shown in section;

Fig. 4 is a detail, being an enlarged perspective view of a corner portion of the truck frame and the car body supporting means connected to the truck frame at such corner;

Fig. 5 is a side elevation of two of the trucks connected in tandem fashion by means of a comparatively long load-supporting frame that is pivotally connected to the central portion of each truck frame,—the car-body supports in this arrangement of the trucks being omitted; and Fig. 6 is a side elevation of one of the trucks from which the body supports have been removed, as in Fig. 5, to adapt the truck to carry, as shown in this view, one or more removable receptacles.

Figure 1:
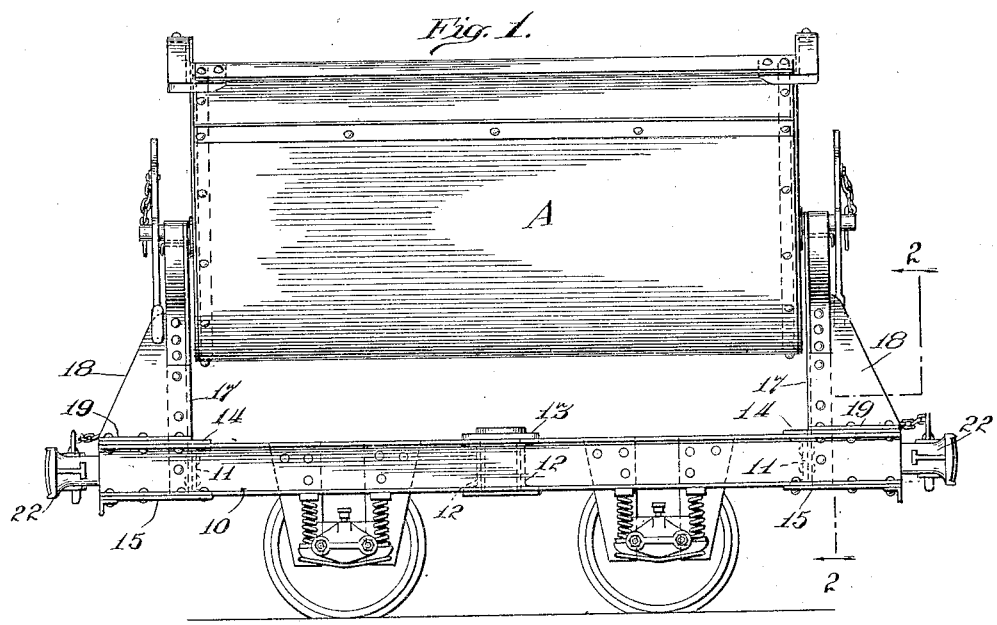
Figure 1 is a side elevation of a dump-car embodying my improvements.

Referring to the several figures of the drawings,—10 indicates the side bars of the truck frame, preferably formed of channel-irons as shown, such side bars being connected together by heavy cross-bars 11 also formed of channel-irons and riveted to the bars 10 and each located a short distance from one end of the truck, as clearly indicated by broken lines in Fig. 1. The side bars 10 are further connected at approximately their central portions by two separated bars 12 that constitute a bolster, upon the central portion of which is riveted the raised bearing plate 13 that coöperates with one of the two corresponding bearings on the under side of the truck connecting frame shown in Fig. 5 and hereinafter more particularly referred to. The ends of the truck frame are each built up with heavy metal plates 14 and 15 that lie respectively against the upper and lower flanges of the side bars 10 and cross-bars 11, to which members 10 and 11 said plates are riveted. These upper and lower end plates give to the frame great rigidity and contribute greatly to the life of the frame by enabling the car to resist bumper shocks in hauling. The two inner corners of each upper plate 14 are cut away, as best shown in Fig. 3, to provide openings 16. 17, 17 indicate two car-body supports located at opposite end portions of the truck frame and rising therefrom sufficiently high to support between them in a rocking manner a car-body A adapted to turn so as to discharge its load at either side. Such car-body, by itself, forms no part of my present invention nor do the means for locking it in place, and hence no detailed description thereof is deemed necessary. Each car-body support, in the construction shown, comprises an angle-iron strip bent to form a member having a curved central portion *a* upon which one end of the car-body is rockingly mounted and from which diverge downwardly two arms *b*, *b*, that terminate in vertical ends *c*, *c*, respectively. (See Fig. 2). Each of these vertical end portions projects through one of the openings 16 in an upper end plate 14 and its two flanges rest against and are suitably secured to the adjacent side bar 10 and cross-bar 11,—see Figs. 3 and 4. 18 indicates a bracing member at each corner of the truck frame, each of such members 18 serving to connect an arm *b* of a support 17 with the adjacent end portion of one of the side bars 10. Each bracing member 18, in the construction illustrated, is formed of a heavy flat metal plate that along its inner margin rests upon and is riveted to the outer face of one of the diagonal arms *b* and at its lower margin is turned outward to form a flange 19 that rests upon the upper flange of the adjacent side bar 10 to which it is also riveted,—see Fig. 4. As will be appreciated these bracing members 18 so secure the supports 17 that the latter are securely held in place notwithstanding the severe shocks and strains that the car as a whole is subjected to in service. The coupling heads are indicated by 22 and as shown project from between the upper and lower plates 14 and 15, the inner end portion or shank member of each passing through an opening in the web of the adjacent channel-iron cross-bar 11 and having secured on the part that extends beyond said cross-bar a heavy coiled spring 23 that bears against the face of said cross-bar. The bracing effect of the plates 14 and 15 will assist very materially in maintaining the rigidity of the frame as a whole and in resisting the strains put upon the cross-bar during the hauling of the car.

Figure 2:
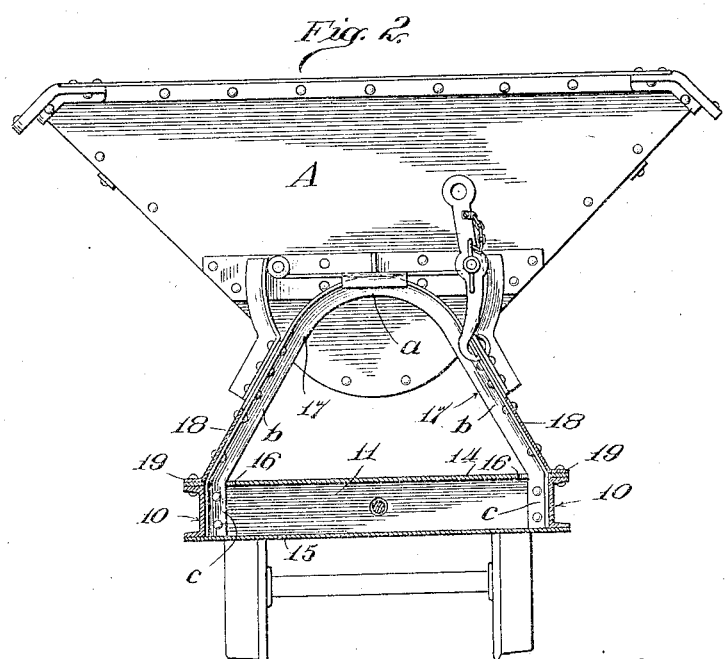
Fig. 2 is an end view of the body of the dump car shown in Fig. 1, and showing in section (the section being at line 2—2 of Fig. 1) the frame of the car-truck and a portion of the supporting means that rises therefrom for pivotally securing said body in place.

If it be desired to use the truck for other purposes than supporting a tilting car-body such as shown in Figs. 1 and 2, the car-body can be removed by the use of a crane, and then if the supports 17 and bracing members 18 are found to be an obstruction to the desired use of the truck such parts 17 and 18 can be removed by cutting and punching out the rivets that secure them to the truck frame, which is an operation capable of being done with comparative ease with the tools and apparatus that will ordinarily form part of the equipment of a road-building contractor, and such supports and bracing members can likewise be refastened in place with equal readiness when it is again desired to use the car-body on the truck. While bolts might be used in place of such rivets I do not recommend their use, for with the rough usage to which the trucks are necessarily subjected the rivets are much more dependable fastening devices and such dependability outweighs in importance the relative difficulty of removing and replacing rivets and bolts. Of course each support 17 will at all times have its bracing members 18, 18 connected to it,—the support and its two bracing members being treated as a unit for removal and replacement purposes. While these units, each composed of the parts 17 and 18, are securely fastened in place as described and would not therefore ordinarily be described as removable, yet as it is contemplated that they may and shall be removed and replaced as required to adapt the truck to different uses, I desire it to be understood, for the purposes of this invention, that I consider those parts as members that are removable from the truck proper.

In Figs. 5 and 6 I have shown two instances where the trucks with their body-supports 17 and braces 18 removed are advantageously employed. In Fig. 5 two trucks spaced a distance apart are connected up by a comparatively long load-supporting platform 20 adapted to receive rails, telegraph-poles or other long articles, and in Fig. 6 each truck furnishes a support for one or more heavy receptacles such as contractors' "batch boxes" which rest upon the side bars and end cross-bars of the truck and are adapted to be lifted on and off by a crane as usual. In the construction of Fig. 5 where two trucks are arranged spaced apart and connected through the platform 20 the center bearings 13 of each truck coöperate with similar bearings 21 secured to the under face of said platform 20, through registering holes in each pair of bearings passing a king bolt,—the connected trucks being thereby permitted to independently follow the curves of the railway track to the same extent as if their drawheads were connected together in the usual manner.

By my improvements I provide a strong and simple construction for supporting a dump-car body upon a truck and one that, upon the removal of such body and its supporting devices, leaves the truck in condition to be immediately availed of for the transportation of other articles used in the work of road-building contractors and not adapted to be carried in a tiltable car-body.

What I claim as my invention and desire to secure by Letters Patent, is—

1. A truck frame comprising side bars and two connecting cross-bars, each cross-bar being located at a distance from one end of the truck, and a plate at each end of the truck secured along its inner edge and its ends, respectively, to said cross-bar and the portions of the side bars that project beyond the cross-bar.

2. A truck frame comprising side bars and two connecting cross-bars, each cross-bar being located at a distance from one end of the truck, and a plate at each end of the truck secured along its inner edge and its ends, respectively, to said cross-bar and the portions of the side bars that project beyond the cross-bar, said plate having an opening at each of its end portions for the passage of a car-body support that is to be secured to the truck frame.

3. A truck frame comprising side bars and two connecting cross-bars, each cross-bar being located at a distance from one end of the truck, and a plate at each end of the truck secured along its inner edge and its ends, respectively, to said cross-bar and the portions of the side bars that project beyond the cross-bar, said plate having an opening at each corner to permit the passage of a car-body support so that it may rest against the adjacent cross-bar and side bar.

4. A truck frame comprising side bars and two connecting cross-bars, each cross-bar being located at a distance from one end of the truck, and plates at each end of the truck secured along their inner margins to the upper and lower marginal portions, respectively, of a cross-bar and along their margins to the upper and lower marginal portions of the projecting ends of said side bars.

5. A truck frame comprising side bars and two connecting cross-bars, each cross-bar being located at a distance from one end of the truck, and plates at each end of the truck secured along their inner margins to the upper and lower marginal portions, respectively, of a cross-bar and along their end margins to the upper and lower marginal portions of the projecting ends of said side bars, the upper one of each of said plates having an opening at each end for the passage of a car-body support to be secured to said frame.

6. A truck frame comprising side bars and two connecting cross-bars, each cross-bar being located at a distance from one end of the truck, and plates at each end of the truck secured along their inner margins to the upper and lower marginal portions, respectively, of a cross-bar and along their end margins to the upper and lower marginal portions of the projecting ends of said side bars, the upper one of each of said plates having an opening at each corner to permit the passage of a car-body support so that it may rest against the adjacent cross-bar and side bar.

7. A truck frame comprising side bars, two connecting cross-bars, each of which is located at a distance from one end of the truck, and a plate at each end of the car secured along its inner margin and its ends, respectively, to said cross-bar and the portions of the side bars that project beyond the cross-bar, in combination with a car-body support rising from each end portion of the truck, said supports extending through openings in the plates and being secured in place in the angles formed by said side bars and cross-bars.

8. A truck frame comprising side bars, two connecting cross-bars, each of which is located at a distance from one end of the truck, and a plate at each end of the car secured along its inner margin and its ends, respectively, to said cross-bar and the portions of the side bars that project beyond the cross-bar, in combination with a car-body support rising from each end portion of the truck, said supports comprising angle-irons the lower end portions of which project through openings in the inner corners of said plate and rest against and are secured to said side bars and cross-bar.

9. A truck frame comprising side bars, two connecting cross-bars, each of which is located at a distance from one end of the truck, and a plate at each end of the car secured along its inner margin and its ends, respectively, to said cross-bar and the portions of the side bars that project beyond the cross-bar, in combination with a car-body support rising from each end portion of the truck, each of said supports comprising a central body-supporting portion and two downwardly-diverging arms whose lower ends extend through openings in the opposite ends of one of said plates, and means for securing said ends in place below such plate.

10. A truck frame comprising side bars, two connecting cross-bars, each of which is located at a distance from one end of the truck, and a plate at each end of the car secured along its inner margin and its ends, respectively, to said cross-bar and the portions of the side bars that project beyond the cross-bar, in combination with a car-body support rising from each end portion of the truck, each of said supports comprising a central body-supporting portion and two downwardly-diverging arms whose lower ends extend through openings in the opposite ends of one of said plates, and means for securing said ends to both of said side bars and to the adjacent cross-bar.

11. A truck frame comprising side bars, two connecting cross-bars, each of which is located at a distance from one end of the truck, and a plate at each end of the car secured along its inner margin and its ends, respectively, to said cross-bar and the portions of the side bars that project beyond the cross-bar, in combination with a car-body support rising from each end portion of the truck, each of said supports being formed of an angle-iron and comprising a central body-supporting portion, two diverging arms extending downwardly from said central portion, and a vertical end member on each arm, said end members extending through openings in the inner corners of said plate and lying against and being attached to the adjacent cross-bar and also to the said side bars.

12. A truck frame comprising side bars and means connecting said bars together, in combination with a car-body support rising from each end portion of the truck frame, each support comprising a central body-supporting portion and two downwardly-diverging arms adapted to be secured to the truck frame, and a brace for each arm consisting of a plate secured along one margin to the arm and having its lower marginal portion turned to lie over and be secured to the adjacent side bar of the truck frame.

13. A truck frame comprising side bars and two connecting cross-bars, each cross-bar being located at a distance from one end of the truck and in substantially the same horizontal planes as said side bars, in combination with a car-body support rising from each end portion of the truck frame, each support comprising a central body-supporting portion and two downwardly-diverging arms adapted to be secured to the truck frame, and a brace for each arm consisting of a plate secured along one margin to the arm and having its lower marginal portion turned to lie over and be secured to the upper face of the adjacent side bar of the truck frame.

14. A truck frame comprising side bars, two connecting cross-bars, each of which is located at a distance from one end of the truck, and a plate at each end of the truck covering the space between one of the cross-bars and the portions of the side bars that project beyond the cross-bar, said plate being connected to such cross-bar and also to the side-bars and having an opening through it at each inner corner, in combination with a car-body support at each end of the truck, each of said supports having outwardly and downwardly inclined arm members that pass through the said corner openings in one of the plates, means for securing said arms to the adjacent cross-bar and also to the two side bars, and a brace for each arm consisting of a plate secured along one margin to the arm and having its lower marginal portion turned to rest upon said first-mentioned plate and with that plate be secured to the adjacent side bar of the truck frame.

15. A truck frame adapted to support a rocking car-body or to be converted into one of a pair of trucks that are adapted to be flexibly united for supporting articles too long to be carried by a single truck, said frame comprising removable supports adjacent each end of the truck for sustaining such body and having also intermediate of its ends a bolster provided with a bearing whereby two of such trucks are adapted to be flexibly connected together by a member extending over them and resting upon and connected with said bearings of the two trucks.

JAMES D. BENBOW.